United States Patent Office 3,123,614
Patented Mar. 3, 1964

3,123,614
DIHYDROPYRIDOBENZOXAZEPINE
DERIVATIVES
Harry L. Yale, New Brunswick, Francis A. Sowinski, Edison, and Jack Bernstein, New Brunswick, N.J., assignors to Olin Mathieson Chemical Corporation, New York, N.Y., a corporation of Virginia
No Drawing. Filed Aug. 8, 1962, Ser. No. 215,549
11 Claims. (Cl. 260—296)

This invention relates to new basically substituted dihydropyridobenzoxa(and thia)zepines (and their salts) having valuable therapeutic properties, processes for the preparation of the same, and new intermediates useful in such processes.

The therapeutically active compounds of this invention include dihydropyridobenzoxa(and thia)zepines of the general formula I:

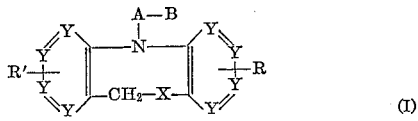

wherein A is a lower alkylene radical of at least two carbon atoms; B is a basic saturated nitrogen-containing radical of less than twelve carbon atoms; X is oxy or thio; one Y is aza and the remaining Y's are carbon; and R and R' are the same or different and represent hydrogen, halogen, lower alkyl, lower alkoxy, trifluoromethyl, trifluoromethylmercapto, trifluoromethoxy or N,N-dimethylaminosulfonyl. Among the suitable radicals represented by the symbol B are: amino; (lower alkyl)-amino; di(lower alkyl)amino; (hydroxy-lower alkyl)-amino; di(hydroxy-lower alkyl)amino; and basic saturated 5 to 7 membered N-heterocyclic radicals of less than twelve carbon atoms, as exemplified by piperidyl [i.e., piperidino, 2-piperidyl, 3-piperidyl and 4-piperidyl]; (lower alkyl)piperidyl [e.g., 2, 3, or 4-(lower alkyl)-piperidino or 2, 3, or 4-(N-lower alkyl)piperidyl]; di-(lower alkyl)piperidyl [e.g., 2,4-, 2,5- or 3,5-di(lower alkyl)piperidino, or 2, 3, or 4-(N-lower alkyl-2,3, or 4-(lower alkyl)piperidyl]; (lower alkoxy)piperidyl; homopiperidino; pyrrolidyl; (lower alkyl) pyrrolidyl; di(lower alkyl)pyrrolidyl; (lower alkoxy)pyrrolidyl; morpholinyl [i.e., morpholino, 2-morpholinyl and 3-morpholinyl]; (lower alkyl)morpholinyl; di(lower alkyl)morpholinyl; (lower alkoxy)morpholinyl; thiamorpholinyl; (lower alkyl)thiamorpholinyl; di(lower alkyl)-thiamorpholinyl; (lower alkoxy)-thiamorpholinyl; piperazyl; (lower alkyl)-piperazyl (e.g., $N^4$-methylpiperazino); di(lower alkyl)-piperazyl; (lower alkoxy)piperazyl; (hydroxy-lower alkyl)piperazyl [e.g., $N^4$-(2-hydroxy-ethyl)piperazino]; (lower alkanoyloxy-lower alkyl)piperazyl [e.g., $N^4$-(2-acetoxyethyl)piperazino]; (hydroxy-lower alkoxy-lower alkyl)piperazyl [e.g., $N^4$-(2-hydroxyethoxy-ethyl)piperazino]; (carbo-lower alkoxy)-piperazyl [e.g., $N^4$-(2-carbomethoxy, carboethoxy, or carbopropoxy)piperazino]; and homopiperazino. The terms "lower alkyl," "lower alkoxy," and "lower alkylene," as employed herein, include both straight and branched chain radicals of less than eight carbon atoms. The particularly preferred compounds are those wherein A is a lower alkylene radical of two to three carbon atoms (e.g., ethylene, trimethylene-1,3 and propylene-1,2); B represents a di(lower alkyl)-amino radical, an $N^4$-(lower alkyl)piperazino radical, an $N^4$-(2-hydroxyethyl)piperazino radical, or an $N^4$-(2-acetoxyethyl)paperazino radical, and R and R' are hydrogen.

As to salts of the bases of this invention, those coming within the purview of this invention include the acid-addition salts, particularly, the non-toxic acid-addition salts. Acids useful for preparing the acid-addition salts, include, inter alia, inorganic acids, such as the hydrohalic acids (e.g., hydrochloric and hydrobromic acid), sulfuric acid, nitric acid and phosphoric acid, and organic acids, such as oxalic, maleic, tartaric, citric, acetic and succinic acid.

The compounds of this invention are therapeutically active compounds which are utilizable both as ataractic agents, and thus may be used in the treatment of depressed psychotic states, and as antihistamines. For these purposes they may be administered orally or parenterally in conventional dosage forms such as tablets, capsules, injectables or the like by incorporating the appropriate dose of the compound with carriers according to accepted pharmaceutical practice.

The compounds of this invention are prepared by a series of reactions as shown by the following equations, wherein R, R', X, Y, A and B are as hereinbefore defined; X' is chloro or bromo; and one X" is chloro or bromo; and the other X" is hydroxy or thiol:

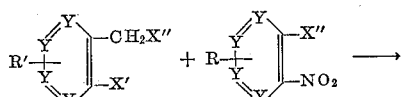

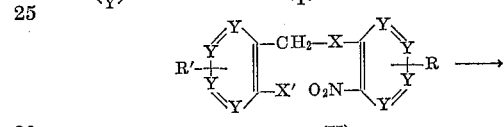
(II)

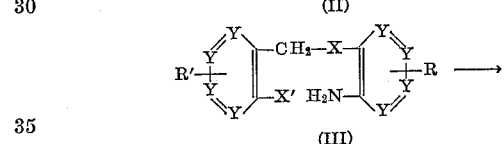
(III)

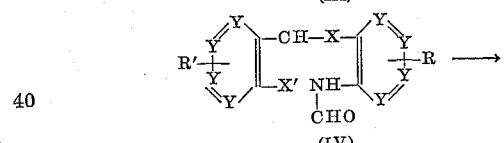
(IV)

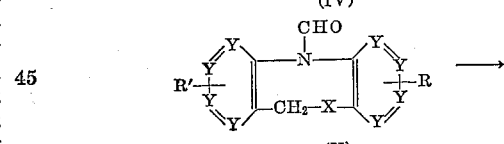
(V)

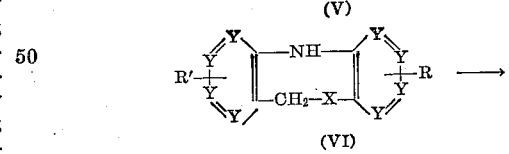
(VI)

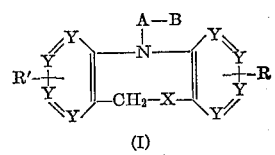
(I)

Among the suitable o-halobenzyl halides utilizable as initial reagents in these reactions may be mentioned: o-halobenzyl halides, such as o-bromobenzyl bromide, o-chlorobenzyl chloride and o-bromobenzyl chloride; halo-o-halobenzyl halides, such as 2,5-dibromobenzyl bromide, 2,4-dibromobenzyl bromide, 2-bromo-5-fluorobenzyl chloride, 2-bromo-5-chlorobenzyl chloride, and 2-bromo-4-fluorobenzyl chloride; (lower alkyl)-o-halobenzyl halides, such as 5-(lower alkyl)-2-halobenzyl halides, (e.g., 5-methyl-2-bromobenzyl chloride, 5-ethyl-2-bromobenzyl bromide, 5-n-propyl-2-bromobenzyl bromide and 5-n-hexyl-2-chlorobenzyl chloride) and 4-(lower alkyl)-2-halobenzyl halides; (lower alkoxy)-o-halobenzyl halides, such as 5-(lower alkoxyl)-2-halobenzyl halides (e.g., 5-methoxy-2-bromobenzyl bromide, 5-ethoxy-2-bromobenzyl chloride, 5-n-propoxy-2-bromobenzyl chloride and 5-n-hexyloxy-2-chlorobenzyl chloride); (trifluoromethyl)-o-halobenzyl halides, such as 5-(trifluoromethyl)-2-bromobenzyl chloride and 4-(trifluoromethyl)-2-bromobenzyl bromide; (trifluoromethylmercapto)-o-halobenzyl halides, such as 5-(trifluoromethylmercapto)-2-bromobenzyl chloride and 4-(trifluoromethylmercapto)-2-bromobenzyl bromide; (trifluoromethoxy)-o-halobenzyl halides, such as 5-(trifluoromethoxy)-2-bromobenzyl chloride and 4-(trifluoromethoxy)-2-bromobenzyl bromide; and (N,N-dimethylaminosulfonyl)-o-halobenzyl halides, such as 5-(N,N-dimethylaminosulfonyl)-2-bromobenzyl chloride and 4-(N,N-dimethylaminosulfonyl)-2-bromobenzyl bromide. The corresponding benzyl alcohols are also utilizable, as are compounds wherein one of the —CH= radicals is replaced with —N=.

Among the suitable o-nitropyridinethiols and o-nitropyridinols utilizable as initial reagents in these reactions may be mentioned: 2-nitro-3-pyridinol; 2-nitro-3-pyridinethiol; 3-nitro-2-pyridinol; 3-nitro-2-pyridinethiol; 3-nitro-4-pyridinol; 3-nitro-4-pyridinethiol; 4-nitro-3-pyridinol; 4-nitro-3-pyridinethiol; halo substituted derivatives of each of these, such as 5-chloro-2-nitro-3-pyridinol, 5-chloro-3-nitro-2-pyridinol, 5-chloro-2-nitro-3-pyridinethiol, 5-chloro-3-nitro-2-pyridinethiol, 4-chloro-2-nitro-3-pyridinol, 5-fluoro-2-nitro-3-pyridinethiol, 5-bromo-2-nitro-3-pyridinol and 5-bromo-2-nitro-3-pyridinethiol; (lower alkyl) substituted derivatives of each of these, such as 5-methyl-2-nitro-3-pyridinol, 5-methyl-3-nitro-2-pyridinol, 5-methyl-2-nitro-3-pyridinethiol, 5-methyl-3-nitro-2-pyridinethiol, 4-methyl-2-nitro-3-pyridinol, 5-propyl-2-nitro-3-pyridinethiol, 5-ethyl-2-nitro-3-pyridinol and 5-n-hexyl-2-nitro-3-pyridinethiol; (lower alkoxy) substituted derivatives of each of these, such as 5-methoxy-2-nitro-3-pyridinol, 5-methoxy-3-nitro-2-pyridinol, 5-methoxy-2-nitro-3-pyridinethiol, 5-methoxy-3-nitro-2-pyridinethiol, 4-ethoxy-2-nitro-3-pyridinol, 5-propoxy-3-nitro-2-pyridinethiol, 5-ethoxy-2-nitro-3-pyridinol and 5-n-hexyloxy-2-nitro-3-pyridinethiol; trifluoromethyl substituted derivatives of each of these, such as 5-trifluoromethyl-2-nitro-3-pyridinol, 5-trifluoromethyl-3-nitro-2-pyridinol, 5-trifluoromethyl-2-nitro-3-pyridinethiol, 5-trifluoromethyl-3-nitro-2-pyridinethiol and 4-trifluoromethyl-2-nitro-3-pyridinol; trifluoromethoxy substituted derivatives of each of these, such as 5-trifluoromethoxy-3-nitro-2-pyridinol; trifluoromethylmercapto substituted derivatives of each of these, such as 5-trifluoromethylmercapto-3-nitro-2-pyridinol; and N,N-dimethylaminosulfonyl derivatives of each of these. The corresponding o-nitropyridinechlorides are also utilizable, as are compounds wherein the —N= radical is replaced by —CH=.

In the initial reaction of the process of this invention, the reaction is preferably conducted in the presence of a condensation agent, such as a base (e.g., sodium hydroxide), whereby a corresponding ether or thioether (compound II) is formed. The nitro group is then reduced to an amine by treatment with a reducing agent such as nascent hydrogen, which may be formed in situ by the action of an electro-positive metal on an acid, thereby forming the corresponding amine derivative (compound III).

The amine derivative (compound III) is then treated with formic acid whereby the corresponding formamide derivative (compound IV) is produced. Compound IV is then cyclized by treatment with a basic reagent (e.g., potassium carbonate and sodium carbonate) in a solvent (e.g., N,N-dimethylformamide, N,N-dimethylacetamide and nitrobenzene) at an elevated temperature, whereby the corresponding dihydropyridiobenzoxa or thia zepine derivative (compound V) is formed. The formamide is then hydrolyzed, as by treatment with a base (e.g., sodium hydroxide) at an elevated temperature to yield the dihydropyridobenzoxa or thia zepine derivative (compound VI).

Compound VI is then treated with a basically substituted alkyl halide of the formula: B—A halide, wherein B and A are as hereinbefore defined, the reaction preferably being conducted in the presence of a basic condensation reagent such as sodium hydride to yield the final products of this invention (compounds I). The same compounds can alternatively be prepared in two steps, by first reacting with an alkylene dihalide of the formula: (halide)—A—(halide) and then with a base of the formula: BH. To prepare the acid-addition salts, the resulting base is treated with the desired acid in the usual manner.

The following examples illustrate the invention (all temperatures being in centigrade). The first seven examples are directed to the preparation of the N-unsubstituted intermediates and the remaining examples are directed to the preparation of the final compounds of this invention.

EXAMPLE 1

*5,10-Dihydropyrido[3,2-b][4,1]Benzoxazepine*

(a) *Preparation of o-bromobenzyl 3-nitro-2-pyridyl ether.*—To a stirred solution of 93.5 g. of o-bromobenzyl alcohol and 79.3 g. of 2-chloro-3-nitropyridine in 400 ml. of 95% ethyl alcohol is added dropwise a solution of 39.6 g. of 85% potassium hydroxide in 200 ml. of water and the reaction mixture is subsequently refluxed for two hours. After cooling, the product separates and is filtered, washed well with water, and air dried to give o-bromobenzyl-3-nitro-2-pyridyl ether.

(b) *Preparation of 2'(o-bromobenzyloxy)-3'-aminopyridine hydrochloride.*—To a stirred mixture of 142 g. of o-bromobenzyl 3-nitro-2-pyridyl ether in 3.5 l. of 95% isopropanol, heated to 40°, is added at 5 minute intervals 54 g. of iron powder and 5 ml. of concentrated hydrochloric acid until a total of 270 g. of iron powder and 25 ml. of hydrochloric acid have been added. The reaction mixture is then refluxed for one hour, filtered hot, the filtrate is treated with 72 ml. of concentrated hydrochloric acid.

(c) *Preparation of 2'-(o-bromobenzyloxy)-3'-formamidopyridine.*—To 152 g. of 2-(o-bromobenzyloxy)-3-aminopyridine hydrochloride and 34 g. of sodium formate is added 250 ml. of 98–100% formic acid and the mixture refluxed for two hours. The solid which separates on cooling is filtered and washed well with water to give 2'-(o-bromobenzyloxy)-3'-formamidopyridine.

(d) *Preparation of 5,10-dihydropyrido[3,2-b][4,1]-benzoxazepine-5-carboxaldehyde.*—A stirred mixture of 50 g. of 2'-(o-bromobenzyloxy)-3'-formamidopyridine, 28 g. of anhydrous potassium carbonate, 5 g. of copper bronze, and 500 ml. of N,N-dimethylformamide is heated in an oil bath maintained at 155–160° for four hours. The reaction mixture is then filtered hot and the filtrate concentrated to dryness. The residue is washed with water, dried thoroughly and extracted with boiling petroleum ether. The petroleum ether solution is cooled to give 5,10-dihydropyrido[3,2-b][4,1]benzoxazepine-5-carboxaldehyde.

(e) *Preparation of 5,10-dihydropyrido[3,2-b][4,1]-benzoxazepine.*—A mixture of 22.6 g. of 5,10-dihydropyrido[3,2-b][4,1]benzoxazepine-5-carboxaldehyde, 200 ml. of 95% ethanol and 7.1 g. of potassium hydroxide in 21 ml. of water are refluxed for one hour and concentrated to dryness. The residual solid is washed with water, dried thoroughly and extracted consecutively with three 100 ml. portions of boiling hexane. The combined hexane extracts are decolorized with carbon and concentrated to about 100 ml. to give 5,10-dihydropyrido[3,2-b][4,1]benzoxazepine.

EXAMPLE 2

9-Chloro-6,11-Dihydropyrido[3,4-b][4,1]Benzoxazepine (a) *Preparation of o-bromo-p-chlorobenzyl-3-nitro-4-pyridyl ether.*—By substituting 111 g. of o-bromo-p-chlorobenzyl alcohol (prepared by the reduction of o-bromo-p-chlorobenzoic acid) for the o-bromobenzyl alcohol and 79.3 g. of 4-chloro-3-nitropyridine for the 2-chloro-3-nitropyridine in Example 1, step *a*, there is obtained o-bromo-p-chlorobenzyl 3-nitro-4-pyridyl ether.

(b) *Preparation of 4'-(o-bromo-p-chlorobenzyloxy)-3'-aminopyridine hydrochloride.*—By substituting 160 g. of o-bromo-p-chlorobenzyl-3-nitro-4-pyridyl ether for the o-bromobenzyl 3-nitro-2-pyridyl ether in Example 1, step *b*, there is obtained 4'-(o-bromo-p-chlorobenzyloxy)-3'-aminopyridine hydrochloride.

(c) *Preparation of 4'-(o-bromo-p-chlorobenzyloxy)-3'-formamidopyridine.*—By substituting 164 g. of 4'-(o-bromo-p-chlorobenzyloxyl)-3'-aminopyridine hydrochloride for the 2'-(o-bromobenzyloxy)-3'-aminopyridine hydrochloride in Example 1, step *c*, there is obtained 4'-(o-bromo-p-chlorobenzyloxy)-3'-formamidopyridine.

(d) *Preparation of 9-chloro - 6,11 - dihydropyrido[3,4-b][4,1]benzoxazepine - 11 - carboxaldehyde.*—By substituting 53.7 g. of 4'-(o-bromo-p-chlorobenzyloxy)-3'-formamidopyridine for the 2'-(o-bromobenzyloxy)-3'-formamidopyridine in Example 1, step *d*, there is obtained 9 - chloro-6,11-dihydropyrido[3,4-b][4,1]benzoxazepine-11-carboxaldehyde.

(e) *Preparation of 9-chloro-6,11-dihydropyrido[3,4-b][4,1]benzoxazepine.*—By substituting 24.9 g. of 9-chloro-6,11-dihydropyrido[3,4-b][4,1]benzoxazepine - 11 - carboxaldehyde for the 5,10-dihydropyrido[3,2-b][4,1]benzoxazepine-5-carboxaldehyde in Example 1, step *e*, there is obtained 9-chloro-6,11-dihydropyrido[3,4-b][4,1]benzoxazepine.

EXAMPLE 3

3-Chloro-5,10-Dihydropyrido[3,2-b][4,1]Benzothiazepine (a) *Preparation of o-bromobenzyl 5-chloro-3-nitro-2-pyridyl sulfide.*—To an ice-cooled stirred solution of 31.6 g. of 5-chloro-3-nitro-2-pyridinethiol (prepared from 5-chloro-2-pyridinol via nitration, followed by chlorination and replacement of the 2-chloro atom by SH), 42 g. of o-bromobenzyl bromide and 133 ml. of 95% ethanol is added dropwise a solution of 13.2 g. of 85% potassium hydroxide in 70 ml. of water. Proceeding then as in Example 1, step *a*, there is obtained o-bromobenzyl 5-chloro-3-nitro-2-pyridyl sulfide.

(b) *Preparation of 3-chloro-5,10-dihydropyrido[3,2-b][4,1]benzothiazepine.*—Following the procedures of steps *b*, *c*, *d* and *e* of Example 1, but substituting 180 g. of o-bromobenzyl 5-chloro-3-nitro-2-pyridyl sulfide for the o-bromobenzyl 3-nitro-2-pyridyl ether in step *b*, there is obtained 3-chloro-5,10-dihydropyrido[3,2-b][4,1]benzothiazepine.

EXAMPLE 4

5,11-Dihydro-9-(Trifluoromethyl)Pyrido[4,3-c][1,5]Benzoxazepine

Proceeding as in Example 1 but substituting 112.8 g. of 4-chloro-3-nitrobenzotrifluoride for the 2-chloro-3-nitropyridine and 94 g. of 3-bromo-4-pyridinemethanol for the o-bromobenzyl alcohol in step *a*, there is obtained 5,11-dihydro - 9-(trifluoromethyl)pyrido[4,3-c][1,5]benzoxazepine.

EXAMPLE 5

9-Chloro-5,11-Dihydropyrido[4,3-c][1,5]Benzoxazepine

Proceeding as in Example 4 but substituting 96 g. of 2,5-dichloronitrobenzene for the 4-chloro-3-nitrobenzotrifluoride, there is obtained 9-chloro-5,11-dihydropyrido[4,3-c][1,5]benzoxazepine.

EXAMPLE 6

3,7-Dichloro-5,10-Dihydropyrido[3,2-b][4,1]Benzoxazepine

By substituting 111 g. of o-bromo-p-chlorobenzyl alcohol for the o-bromobenzyl alcohol and 95 g. of 2,5-dichloro-3-nitropyridine for the 2-chloro-3-nitropyridine in step *a* of Example 1 and following the procedures of the example, there is obtained 3,7-dichloro-5,10-dihydropyrido[3,2-b][4,1]benzoxazepine.

EXAMPLE 7

5,11-Dihydro-9-Methyl-Pyrido[4,3-c][1,5]Benzoxazepine

Following the procedure of Example 1, but substituting an equivalent amount of 4-chloro-3-nitrotoluene for the 2-chloro-3-nitropyridine and 94 g. of 3-bromo-4-pyridinemethanol for the o-bromobenzyl alcohol in step *a*, 5,11 - dihydro - 9-methylpyrido[4,3-c][1,5]benzoxazepine is obtained.

Similarly, if 3 - bromo-4-chloromethyl-N,N-dimethylbenzenesulfonamide (prepared by the reaction of p-bromo-N,N-dimethylbenzenesulfonamide with formaldehyde and hydrochloric acid), 3-bromo-4-chloromethyl-(trifluoromethoxy)benzene [prepared by the light catalyzed chlorination of m-bromoanisole to m-bromo-(trichloromethoxy)benzene, followed by reaction with antimony trifluoride to convert the (trichloromethoxy) group to a (trifluoromethoxy) group and treatment of the m-bromo-(trifluoromethoxy)-benzene with formaldehyde and hydrochloric acid], and 3-bromo-4-chloromethyl-(trifluoromethylmercapto)benzene [prepared by the light catalyzed chlorination of m-bromothioanisole to m-bromo-(trichloromethylmercapto)benzene, followed by reaction with antimony trifluoride to convert the (trichloromethylmercapto) group to a (trifluoromethylmercapto) group and treatment of the m-bromo-(trifluoromethylmercapto) benzene with formaldehyde and hydrochloric acid] are substituted for the o-bromobenzyl bromide in step *a* of Example 3, there are obtained 3-chloro-7-(N,N-dimethylaminosulfonyl) - 5,10 - dihydropyrido[3,2-b][4,1]benzothiazepine, 3 - chloro-7-(trifluoromethoxy)-5,10-dihydropyrido[3,2-b][4,1]benzothiazepine, and 3-chloro-7-(trifluoromethylmercapto) - 5,10-dihydropyrido[3,2-b][4,1]benzothiazepine, respectively.

Similarly, if other substituted o-bromo (or chloro)-benzyl bromides (or chlorides) are substituted for the o-bromobenzyl bromide and other substituted chloronitropyridinethiols, are substituted for the 5-chloro-3-nitro-pyridinethiol in step *a* of Example 3, and the remaining steps of the example are carried out, correspondingly substituted 5,10 - dihydropyrido[3,2-b][4,1]benzothiazepines are prepared.

EXAMPLE 8

5-(2-Dimethylaminoethyl)-5,10-Dihydropyrido[3,2-b][4,1]Benzoxazepine

A stirred mixture of 4.9 g. of 5,10-dihydropyrido[3,2-b][4,1]benzoxazepine, 1.5 g. of a 50% sodium hydride dispersion in mineral oil, and 50 ml. of dried and freshly distilled tetrahydrofuran is stirred at room temperature for one-half hour. 4.0 g. of 2-dimethylaminoethyl chloride is then added. The resulting mixture is heated under reflux for three hours, a second portion of 1.2 g. of sodium hydride dispersion and 2.7 g. of 2-dimethylaminoethyl chloride added and the reflux is continued for an additional three hours. The reaction mixture is then worked up to give 5-(2-dimethylaminoethyl)5,10-dihydropyrido[3,2-b][4,1]benzoxazepine.

EXAMPLE 9

5-(2-Dimethylaminoethyl)-5,10-Dihydropyrido[3,2-b][4,1]Oxazepine Maleate 3 g. of 5-(2-dimethylaminoethyl)-5,10-dihydropyrido-[3,2-b][4,1]benzoxazepine, dissolved in dry ether, is treated dropwise with 1 equivalent of maleic acid in a minimum amount of warm anhydrous isopropanol. The crystalline product separates directly and is filtered to give 5 - (2-dimethylaminoethyl)-5,10-dihydropyrido[3,2-b][4,1]oxazepine maleate.

EXAMPLE 10

*11-(3-Benzylmethylaminopropyl)-9-Chloro-6,11-Dihydropyrido[3,4-b][4,1]Benzoxazepine*

By substituting 5.2 g. of 9-chloro-6,11-dihydropyrido-[3,4-b][4,1]benzoxazepine for the 5,10-dihydropyrido[3,2-b][4,1]benzoxazepine and 7.0 g. and 4.7 g. of N-(3-chloropropyl)-N-methylbenzylamine for the two increments of 2-dimethylaminoethyl chloride in Example 8, there is obtained 11 - (3-benzylmethylaminopropyl)-9-chloro-6,11-dihydropyrido[3,4-b][4,1]benzoxazepine.

EXAMPLE 11

*11-(3-Benzylmethylaminopropyl)-9-Chloro-6,11-Dihydro[3,4-b][4,1]Benzoxazepine Hydrochloride*

The base obtained in Example 10 is dissolved in dry ether, the solution cooled in ice and treated with one equivalent of dry hydrogen chloride in dry ether. The product first separates as a gum which soon crystallizes to give the hydrochloride salt.

EXAMPLE 12

*3-Chloro-5-(3-Piperidinopropyl)-5,10-Dihydropyrido-[3,2-b][4,1]Benzothiazepine*

By substituting 6.0 g. of 3-chloro-5,10-dihydropyrido-[3,2-b][4,1]benzothiazepine and 4.9 and 3.3 g. of 3-piperidinopropyl chloride for the two increments of 2-dimethylaminoethyl chloride in Example 8, there is obtained 3-chloro-5-(3-piperidinopropyl)-5,10 - dihydropyrido[3,2-b][4,1]benzothiazepine.

EXAMPLE 13

*9-Chloro-6,11-Dihydro-11-(3-Methylaminopropyl)Pyrido-[3,4-b][4,1]Benzoxazepine Dihydrobromide*

(a) *Preparation of [3-(9-chloro-6,11-dihydropyrido[3,4-b][4,1]benzoxazepin - 11 - yl)propyl]methylcarbamic acid, ethyl ester.*—19.7 g. of 11-(3-benzylmethylaminopropyl) 9-chloro-6,11-dihydropyrido[3,4-b][4,1[benzoxazepine, 22 g. of ethyl chloroformate and 250 ml. of dry benzene are heated under reflux for eighteen hours and concentrated to dryness to give 18.9 g. of [3-(9-chloro-6,11-dihydropyrido[3,4-b][4,1]-benzoxazepin-11 - yl)propyl]-methylcarbamic acid, ethyl ester.

(b) *Preparation of 9-chloro-6,11-dihydro-11-(3-methylaminopropyl)pyrido[3,4-b][4,1]benzoxazepine dihydrobromide.*—18.5 g. of the product obtained in step a in 20 ml. of glacial acetic acid is treated while cold with 67 ml. of a 30% solution of hydrogen bromide in glacial acetic acid. The mixture is kept for 48 hours at room temperature and then diluted with 200 ml. of anhydrous ether. The precipitated oil is separated and washed successively with anhydrous ether, acetone and acetonitrile to give a crystalline product. Recrystallization from ethanol gives about 14.2 g. of 9-chloro-6,11-dihydro-11-(3-methylaminopropyl)pyrido[3,4-b][4,1]benzoxazepine dihydrobromide.

EXAMPLE 14

*11-(2-Dimethylaminoethyl)-5,11-Dihydro-9-(Trifluoromethyl)Pyrido[4,3-c][1,5]Benzoxazepine*

Following the procedure of Example 8 but substituting 5.32 g. of 5,11-dihydro-9-(trifluoromethyl)pyrido[4,3-c][1,5]benzoxazepine for the 5,10-dihydropyrido[3,2-b][4,1]benzoxazepine and 4.5 g. and 3.0 g. of 3-dimethylaminopropyl chloride for the two increments of 2-dimethylaminoethyl chloride, there is obtained 11-(2-dimethylaminoethyl) - 5,11 - dihydro - 9-(trifluoromethyl)pyrido[4,3-c][1,5]benzoxazepine.

EXAMPLE 15

*11-(2-Dimethylaminoethyl)-9-Chloro-5,11-Dihydropyrido-[4,3-c][1,5]Benzoxazepine*

Following the procedure of Example 8 but substituting 4.68 g. of 9-chloro-5,11-dihydropyrido[4,3-c][1,5]benzoxazepine for the 5,10-dihydropyrido[3,2-b][4,1]benzoxazepine, there is obtained 11-(2-dimethylaminoethyl)-9-chloro-5,11-dihydropyrido[4,3-c][1,5]benzoxazepine.

EXAMPLE 16

*5-(2-Dimethylaminoethyl)-3,7-Dichloro-5,10-Dihydropyrido-[3,2-b][4,1]Benzoxazepine*

Following the procedure of Example 8 but substituting 5.1 g. of 3,7-dichloro-5,10-dihydropyrido[3,2-b][4,1]benzoxazepine for the 5,10-dihydropyrido[3,2-b][4,1]benzoxazepine, there is obtained 5-(2-dimethylaminoethyl)-3,7-dichloro-5,10 - dihydropyrido[3,2-b][4,1]benzoxazepine.

EXAMPLE 17

*11-(2-Dimethylaminoethyl)-5,11-Dihydro-9-Methylpyrido-[4,3-c][1,5]Benzoxazepine*

Following the procedure of Example 8 but substituting an equivalent amount of 5,11-dihydro-9-methylpyrido[4,3-c][1,5]benzoxazepine for the 5,10-dihydropyrido[3,2-b][4,1]benzoxazepine, there is obtained 11-(2-dimethylaminoethyl)-5,11-dihydro-9 - methylpyrido[4,3-c][1,5]benzoxazepine.

EXAMPLE 18

*5-[3-($N^4$-Methylpiperazino)Propyl]5,10-Dihydropyrido-[3,2-b][4,1]Benzoxazepine*

Following the procedure of Example 8, but substituting an equivalent amount of 3-($N^4$-methylpiperazino)propyl chloride for the 2-dimethylaminoethyl chloride, 5-[3-($N^4$-methylpiperazino)propyl] - 5,10 - dihydropyrido[3,2-b][4,1]benzoxazepine is obtained.

EXAMPLE 19

*5-{3-[$N^4$-(2-Hydroxyethyl)Piperazino]Propyl}-5,10-Dihydropyrido[3,2-b][4,1]Benzoxazepine*

(a) *Preparation of 5-(3-chloropropyl)-5,10-dihydropyrido-[3,2-b][4,1]benzoxazepine.*—Following the procedure of Example 8, but substituting an equivalent amount of trimethylene chlorobromide for the 2-dimethylaminoethyl chloride, there is obtained 5-(3-chloropropyl)-5,10-dihydropyrido[3,2-b][4,1]benzoxazepine.

(b) *Preparation of 5-{3-[$N^4$-(2-hydroxyethyl)piperazino]propyl} - 5,10 - dihydropyrido[3,2-b][4,1]benzoxazepine.*—To 4.55 g. of 5-(3-chloropropyl)-5,10-dihydropyrido-[3,2-b][4,1]benzoxazepine in 100 ml. of methyl ethyl ketone is added 15 g. of sodium iodide and 23.2 g. of 1-(2-hydroxyethyl)piperazine. The mixture is stirred and refluxed for eighteen hours and concentrated from the steam bath. The residue is diluted with water and extracted with ether. The ether extracts are concentrated to give 5-{3-[$N^4$-(2-hydroxyethyl)piperazino]propyl}5,10-dihydropyrido[3,2-b][4,1]benzoxazepine.

By substituting an equivalent amount of 1-(2-hydroxyethoxyethyl)piperazine or 1-(2-acetoxyethyl)piperazine for the 1-(2-hydroxyethyl)piperazine in step b of Example 19, there is obtained 5-{3-[$N^4$-(2-hydroxyethoxyethyl)piperazino]propyl}5,10 - dihydropyrido[3,2-b][4,1]benzoxazepine and 5-{3-[$N^4$-(2-acetoxyethyl)piperazino]propyl}-5,10 - dihydropyrido[3,2-b][4,1]benzoxazepine, respectively.

The invention may be variously otherwise embodied within the scope of the appended claims.

What is claimed is:

1. A compound selected from the group consisting of bases of the formula

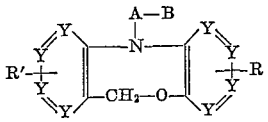

wherein A is lower alkylene of at least two carbon atoms, B is selected from the group consisting of amino, (lower alkyl)amino, di(lower alkyl)amino, (hydroxy-lower alkyl)amino, di(hydroxy-lower alkyl)amino, piperidyl, (lower alkyl)piperidyl, di(lower alkyl)piperidyl, (lower alkoxy)piperidyl, homopiperidino, pyrrolidyl, (lower alkyl)pyrrolidyl, di(lower alkyl)pyrrolidyl, (lower alkoxy)pyrrolidyl, morpholinyl, (lower alkyl)morpholinyl, di(lower alkyl)morpholinyl, (lower alkoxy)morpholinyl, thiamorpholinyl, (lower alkyl)thiamorpholinyl, di(lower alkyl)thiamorpholinyl, (lower alkoxy)thiamorpholinyl, piperazyl, (lower alkyl)piperazyl, di(lower alkyl)piperazyl, (lower alkoxy)piperazyl, (hydroxy-lower alkyl)piperazyl, (lower alkanolyoxy-lower alkyl)piperazyl, (hydroxy-lower alkoxy-lower alkyl)piperazyl, (carbo-lower alkoxy)piperazyl and homopiperazino, one Y is aza and the remaining Y's are carbon, and R and R' are each selected from the group consisting of hydrogen, halogen, lower alkyl, lower alkoxy, trifluoromethyl, trifluoromethylmercapto, trifluoromethoxy, and N,N-dimethylaminosulfonyl; and non-toxic acid-addition salts thereof.

2. 5-[(dilower alkyl)amino(lower alkyl)]-5,10-dihydropyrido[3,2-b][4,1]benzoxazepine.

3. A non-toxic acid addition salt of the compound of claim 2.

4. 5-(2-dimethylaminoethyl)-5,10-dihydropyrido[3,2-b][4,1]benzoxazepine.

5. A compound of the formula

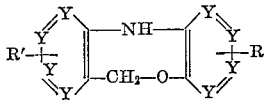

wherein one Y is aza and the remaining Y's are carbon and R and R' are each selected from the group consisting of hydrogen, halogen, lower alkyl, lower alkoxy, trifluoromethyl, trifluoromethylmercapto, trifluoromethoxy and N,N-dimethylaminosulfonyl.

6. 5,10-dihydropyrido[3,2-b][4,1]benzoxazepine.

7. 9-chloro-5,11-dihydropyrido[4,3-c][1,5]benzoxazepine.

8. 3,7-dichloro-5,10-dihydropyrido[3,2-b][4,1]benzoxazepine.

9. A compound of the formula

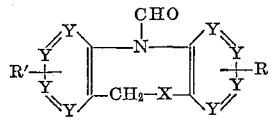

wherein X is selected from the group consisting of oxy and thio, one Y is aza and the remaining Y's are carbon and R and R' are each selected from the group consisting of hydrogen, halogen, lower alkyl, lower alkoxy, trifluoromethyl, trifluoromethylmercapto, trifluoromethoxy and N,N-dimethylaminosulfonyl.

10. 5,10-dihydropyrido[3,2-b][4,1]benzoxazepine-5-carboxaldehyde.

11. 9-chloro-6,11-dihydropyrido[3,2-b][4,1]benzoxazepine-11-carboxaldehyde.

References Cited in the file of this patent

UNITED STATES PATENTS

| | | |
|---|---|---|
| 2,943,086 | Yale et al. | June 28, 1960 |
| 2,974,139 | Schuler et al. | Mar. 7, 1961 |
| 3,038,896 | Habicht et al. | June 12, 1962 |
| 3,079,393 | Yale et al. | Feb. 26, 1963 |
| 3,079,400 | Yale et al. | Feb. 26, 1963 |

FOREIGN PATENTS

| | | |
|---|---|---|
| 1,176,115 | France | Apr. 7, 1959 |
| 1,102,753 | Germany | Mar. 23, 1961 |

OTHER REFERENCES

Bernthesen et al.: "Organic Chemistry," 4th ed., pp. 681–689 (1941) (Blackie).

Kopp et al.: "Arch der Pharm.," vol. 295, pp. 99–106 (1962).